United States Patent

[11] 3,588,150

| [72] | Inventor | Robert A. Wold<br>Fremont, Calif. |
| --- | --- | --- |
| [21] | Appl. No. | 860,454 |
| [22] | Filed | July 18, 1969<br>Division of Ser. No. 731,087, May 22, 1968,<br>Pat. No. 3,488,073 |
| [45] | Patented | June 28, 1971 |
| [73] | Assignee | Raychem Corporation<br>Menlo Park, Calif. |

[54] ATTACHING DEVICE FOR CONVOLUTED TUBING
3 Claims, 8 Drawing Figs.

[52] U.S. Cl. ..................................................... 285/381, 285/423
[51] Int. Cl. ..................................................... F16l 47/00
[50] Field of Search .......................................... 285/381, (DIG. 10), (DIG. 4), 322, 323, 373, 423, 7 (Cursory

[56] References Cited
UNITED STATES PATENTS

| 2,784,987 | 3/1957 | Corcoran ...................... | 285/322X |
| 3,079,187 | 2/1963 | Cantor .......................... | 285/323X |
| 3,212,795 | 10/1965 | Helm et al. ................... | 285/7 |
| 3,291,895 | 12/1966 | VanDyke ...................... | 285/322X |
| 3,315,986 | 4/1967 | Quick............................. | 285/381X |

FOREIGN PATENTS

| 873,095 | 7/1961 | Great Britain................ | 285/381 |

Primary Examiner—Thomas F. Callaghan
Attorney—Lyon & Lyon

ABSTRACT: A device for attaching convoluted tubing to connector backshells or the like in which a split ring or collar is positioned over the end of the convoluted tubing and then positioned within another member such as an end bell having an internal groove for receiving the adapter ring and locking it and the tubing in position.

PATENTED JUN 28 1971
3,588,150
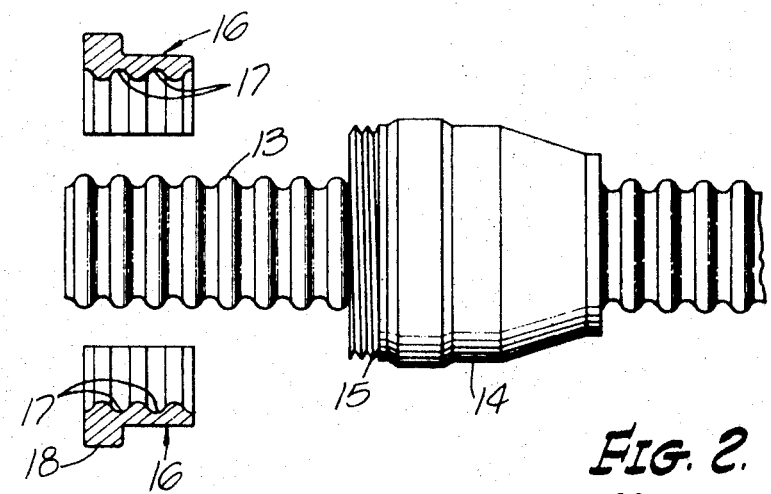
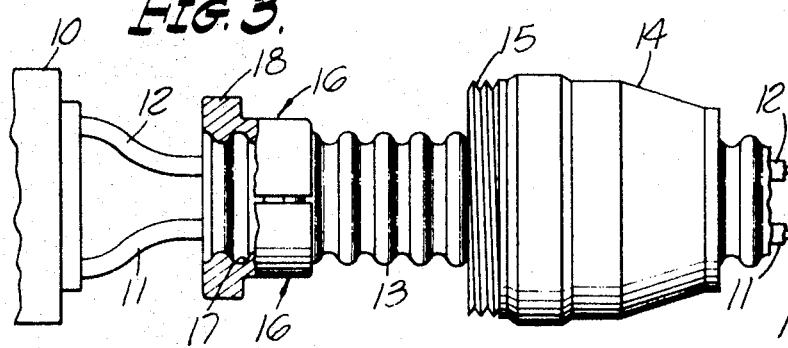
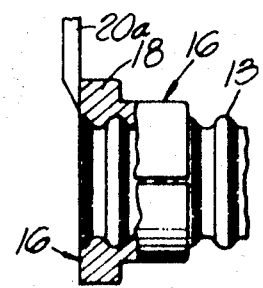
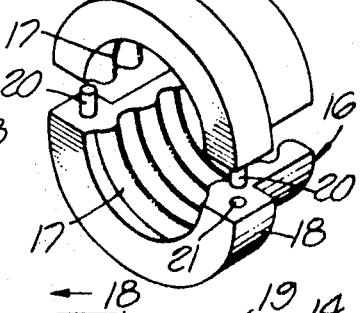
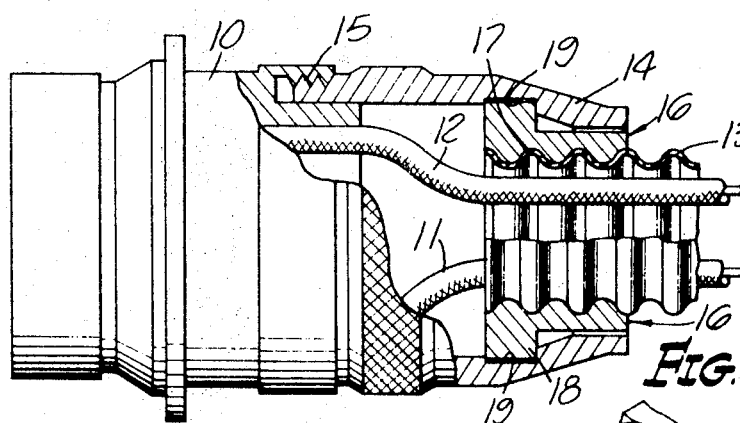
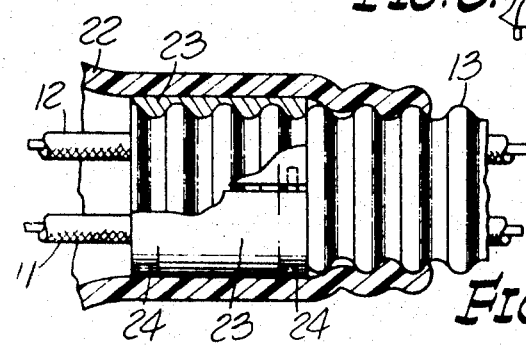
INVENTOR.
ROBERT A. WOLD
BY
Lyon & Lyon
ATTORNEYS

ATTACHING DEVICE FOR CONVOLUTED TUBING

This application is a division of my copending application Ser. No. 731,087 filed May 22, 1968 and now U.S. Pat. No. 3,488,073.

The use of convoluted plastic tubing as a protective sheath for one or more objects is becoming widespread and is desirable because of the strength and flexibility of the tubing. This strength and flexibility are particularly important for applications such as wire harnesses where the protected objects may need to be bent and twisted many times in order to conform to the sometimes tortuous environment in which they must be placed. Some difficulty has been encountered in connecting separate sections of convoluted tubing together or in connecting a length of convoluted tubing with another object such as a connector. Presently available adapters for this purpose crush or deform the tubing and reduce the inner diameter. Also, they do not permit relative rotational movement between the adapter and the tubing with the result that a torque exerted on the tubing often causes cracking or breaking of the tubing.

It is therefore an object of the resent invention to provide an attachment device for attaching convoluted tubing to other objects.

It is also an object of the present invention to provide such an adapter device which does not deform or crush the tubing or reduce its internal diameter and which permits rotation of the tubing within the device.

It is another object of the present invention to provide such an attachment device that is quick and easy to use and yet which forms a strong and reliable connection.

According to the present invention these objects are achieved by providing a multiple piece adapter ring which has an internal configuration the same as that of the convoluted tubing and which has an external flange or ridge which cooperates with an internal groove in an end bell, or with a heat shrinkable part to form a mechanical lock.

The various objects and advantages of the present invention will become more apparent reference to the accompanying description and drawings in which:

FIG. 1 is a side elevation view showing the parts of the present invention before the adapter ring is positioned on the convoluted tubing:

FIG. 2 is a side elevation view showing the elements after the adapter ring has been positioned on the tubing and before the tubing has been trimmed;

FIG. 3 is a side elevation view showing the adapter ring positioned on the tubing after the tubing has been trimmed and the wiring inserted;

FIG. 4 is a side elevation view showing the adapter ring positioned over the tubing and within the end bell but before locking takes place;

FIG. 5 is a side elevation, partly broken away and partly in section, showing the elements of the present invention and after the assembly is completed;

FIG. 6 is a perspective view of an adapter ring according to the present invention;

FIG. 7 is a side elevation, partly broken away and partly in section, showing another embodiment of the present invention wherein locking is accomplished by the use of a heat shrinkable member; and FIG. 8 is a perspective view of a section of the adapter ring used in FIG. 7.

Turning now to FIGS. 1 through 6, there is shown a connector, which may, for example, be a Deutsch type DS-00 connector having a body 10 through which pass wires 11 and 12 into a section of convoluted tubing 13. An end bell 14 is provided for attachment to the connector body 10, for example, by means of screw threads 15. With the apparatus thus far described, it can be seen that the wires 11 and 12 extending from the connector body 10 and passing into the convoluted tubing 13 can be protected from damage by the end bell 14 but that it would be possible for the convoluted tubing 13 to be pulled away from the end bell 14 with the result that the wires 11 and 12 would be exposed.

This is prevented according to the present invention by the use of a split adapter rig preferably made up of two identical sections 16, although more than two sections could be used if desired. In some instances it is also possible to use a single ring that has had a longitudinal section removed therefrom so that it can be expanded to have a diameter sufficiently larger than the tubing to permit it to be positioned thereover and then compressed around the tubing. The inner surface of each of the sections 16 is provided with a plurality of grooves 17 so that it has a configuration that matches that of the convoluted tubing 13. Each of the sections 16 is also provided with an outer circumferential flange or shoulder 18. The shoulder 18 is adapted to cooperate with a groove 19 formed in the inner surface of the end bell 14 as best shown in FIGS. 4 and 5. The total circumference of the inner surfaces of the ring sections is slightly less than the diameter of the tubing whereby the ring sections can be moved together to compress the tubing 13. Preferably, the shoulder 18 of each of the sections 16 is provided with a pin 20 and a hole 21 which cooperate with corresponding elements on the other section to locate the two sections.

When installing the adapter of the present invention, the adapter ring sections 16 are positioned over the convoluted tubing 13 near the end thereof as shown in FIG. 2. A suitable cutting member such as a knife 20a is then preferably used to trim the end of the tubing 13 so that it is flush with the front surface of the adapter ring sections 16 as is shown in FIG. 2. The adapter ring sections are designed so that the cutting of the tubing always occurs at the top of the convolution. The wiring is then inserted.

The end bell is then slidably moved over the adapter ring sections 16. Since the tubing 13 is slightly compressible, the circumferential shoulder 18 of the sections 16 can be forced inside the end bell 14 may be slightly chamfered to assist in the introduction of the sections 16 into the end bell 14. Movement of the end bell 14 is continued until the circumferential shoulder 18 seats within the groove 19 formed in the end bell 14 as shown in FIG. 5. The resiliency of the tubing 13 will force the sections 16 outwardly to accomplish this seating of the shoulder 18. As can be seen, the adapter ring sections 16 are now prevented from movement within the end bell 14 as is the convoluted tubing 13 within the adapter ring sections 16 so that the convoluted tubing 13 cannot now be withdrawn from the end bell 14.

As shown, the convoluted tubing has an annular ring design, that is, the convolutions are normal to the axis of the tubing. The present invention can also be used with helical tubing. In the case of helical tubing, it is desirable to bond the adapter ring sections to the convoluted tubing by a suitable adhesive to prevent the tubing from being rotated and unscrewed from the adapter ring. Of course, the adapter ring sections can also be bonded to annular ring tubing if desired.

FIGS. 7 and 8 show a modification of the present invention wherein a heat shrinkable member 22 is used to form a lock for the adapter ring sections instead of an end bell as shown in the preceding FIGS. The heat shrinkable member may be constructed in any known manner from the various conventional materials such as those described in Currie U.S. Pat. No. 2,027,962 and Cook et al. U.S. Pat. No. 3,086,242. As best shown in FIG. 8 the adapter ring sections 23 of this modification of the invention are provided with two sets of protruding teeth 24 on the outer periphery thereof. This provides a greater surface area for engagement with the heat recoverable member 22 and thus results in a strengthened mechanical lock between the heat recoverable member and the adapter ring. In some cases, the simple shoulder shown in the preceding FIGS. may be sufficient to form a lock but the structure shown in FIG. 8 is preferred. Where a heat recoverable locking member is used, there is no necessity that the inner circumference of the adapter ring be less than the circumference of the tubing.

In installing the modification of the invention shown in FIGS. 7 and 8, the adapter ring sections 23 are positioned over the tubing and the end of the tubing then trimmed as described previously. The tubing together with the ring sections 23 is then positioned within the heat recoverable member 22 and the later heated above its heat recovery temperature causing it to shrink down around the ring sections 23 and form a mechanical lock therewith. For ease in handling, it is preferred that the ring sections 23 be bonded to the tubing 13 prior to the trimming step.

From the foregoing description it can be seen that a device has been provided for making an easily installed yet mechanically reliable lock between a member such as a connector with a section of convoluted tubing without crushing or distorting the tubing or altering the flexibility of the tubing. The invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. An assembly comprising a piece of convoluted tubing, split ring means having grooves formed in the inner surface thereof and at least one protrusion formed on the outer surface thereof, said grooves of said split ring means substantially conforming to the convolutions of said tubing, said split ring means being positioned over said tubing with said grooves interlocking with said convolutions, and a member for receiving said tubing and said split ring means, said member being heat recoverable around said split ring means for lockingly receiving said protrusion of said split ring means.

2. The assembly of claim 1 wherein said split ring means is provided with a plurality of sets of protrusions on the outer surface thereof.

3. The assembly of claim 2 wherein said split ring means comprises a plurality of ring sections.